United States Patent [19]

Kobayashi

[11] Patent Number: 5,200,949
[45] Date of Patent: Apr. 6, 1993

[54] LINK CHANGEOVER CONTROL SYSTEM FOR LOCAL AREA NETWORK OF BROADCASTING ARRANGEMENT

[75] Inventor: Seiichi Kobayashi, Yokohama, Japan

[73] Assignee: Fujitsu Limited, Kanagawa, Japan

[21] Appl. No.: 697,163

[22] Filed: May 8, 1991

[30] Foreign Application Priority Data

May 14, 1990 [JP] Japan .................................. 2-121377

[51] Int. Cl.⁵ .............................................. H04J 3/14
[52] U.S. Cl. ......................................... 370/16; 370/13;
370/54; 371/8.2; 340/825.01; 340/827
[58] Field of Search ..................... 370/16, 13, 16.1, 54;
371/8.1, 11.1, 8.2, 11.2; 340/825.01, 827

[56] References Cited

U.S. PATENT DOCUMENTS

| | | | |
|---|---|---|---|
| 4,205,201 | 5/1980 | Kahn | 370/81 |
| 4,442,518 | 4/1984 | Morimoto | 370/16 |
| 4,648,088 | 3/1987 | Cagle et al. | 370/16.1 |
| 5,130,974 | 7/1992 | Kawamura et al. | 340/827 |

Primary Examiner—Douglas W. Olms
Assistant Examiner—Ajit Patel
Attorney, Agent, or Firm—Nikaido, Marmelstein, Murray & Oram

[57] ABSTRACT

A link changeover control system for a LAN of a broadcasting arrangement has one master supervisor node station and a plurality of normal node stations connected by an active LAN link path and spare LAN link paths. A pilot signal is inserted into a communication signal in the master supervisor node station and the pilot signal is detected in the normal node stations, whereby the active LAN link path is maintained to be used for communication. In the vent of the pilot signal becoming undetectable at least by one of the normal node stations, the master supervisor node station changes the link path used for communication from the acitve LAN link path to one of the spare LAN link paths and, at the same time, the normal node stations changes the link path used for communication from the active LAN link path to the spare LAN link path through which the pilot signal has become detectable.

10 Claims, 9 Drawing Sheets

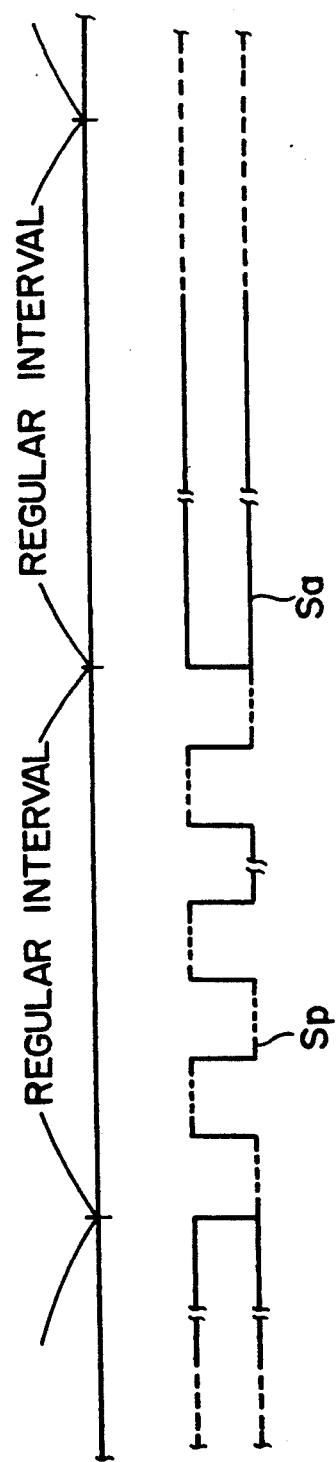

LINK CHANGEOVER CONTROL SYSTEM FOR LOCAL AREA NETWORK OF BROADCASTING ARRANGEMENT

FIELD OF THE INVENTION

The present invention relates to a changeover control system for a local area network (LAN) of a broadcasting arrangement.

BACKGROUND OF THE INVENTION

With the progress of the information-oriented society, communication networks have come to play an important role as the nervous system in a wide variety of social and economic activities and reliability on them in particular is regarded as important. Reliability on the communications networks is very important also in the aspect of facility control of public communications. When, for example, a local control center introduces a LAN having topology of broadcasting arrangement such as a bus type LAN and a star type LAN in a territory under its control, it is especially important that the communications are continuously secured. It is also important to keep down the initial cost when a LAN facility is introduced and the running cost such as repair and maintenance for operating the facility.

Conventionally, when a local control center introduces a LAN with topology of a broadcasting arrangement such as a bus type LAN and a star type LAN as control media within the territory under its control, it is generally practiced that a plurality of offices or stations are connected to one LAN link path so as to be controlled by the control center. In such an arrangement, however, since there is used only one link path, if there occurs a problem such as breaking of the LAN link at a portion thereof and damage to a joint portion between the LAN link path and a station such as a connector or a driver/receiver, the communications are suspended until the damaged portion is restored to the former condition, and thereby, the reliability on the maintenance service of the control center to keep continued communications and render centralized control is lowered.

Accordingly, there is considered a link changeover control system of a LAN of a broad casting arrangement, as shown in FIG. 1, in which there are provided multiplexed link paths 1 formed of an active LAN link path 2 and a plurality of spare LAN link paths $3a, \ldots, 3n$ with a plurality of node stations $4a, 4b, \ldots, 4n$ connected thereto. This system, as shown in FIG. 1, includes a plurality of LAN medium access control devices (hereinafter referred to as "MAC") $5a, 5b, \ldots, 5n$ for the node stations $4a, 4b, \ldots, 4n$, connected with the LAN link paths $2, 3a, \ldots, 3n$, and CPU modules 7 connected to the MAC $5a, 5b, \ldots, 5n$ through CPU bus lines 6 for executing control of logical connections in the LAN.

According to the described arrangement, when, for example, the active LAN link path 2 is broken, or when the MAC $5a$ connected with the active LAN link path 2 gets out of order, a changeover is made so that the MAC $5b, \ldots, 5n$ connected with another LAN link path $3a, \ldots, 3n$ is put into operation under the control of the CPU module 7 so that the communication can be kept on.

By means of such an arrangement, service for keeping up the communication can be rendered. The arrangement is equally effective in the area where reliable service is required of a general purpose LAN facility.

In a link changeover control system of a LAN of a broadcasting arrangement as described above, it is required that MAC $5a, 5b, \ldots, 5n$ corresponding in number to the multiplexed LAN link paths $2, 3a, \ldots, 3n$ are used, and hence, there arises a difficulty that the initial cost at the introduction of the facility becomes high and the running cost increases for repair and maintenance according as the number of component parts increases.

SUMMARY OF THE INVENTION

Accordingly, an object of the present invention is to provide a link changeover control system of a LAN of a broadcasting arrangement which is capable of rendering continued service of uninterrupted communications and curtailing initial cost at the introduction of the facility and the running cost for maintenance and the like of the facility.

In accordance with an aspect of the present invention, there is provided a link changeover control system for a LAN of a broadcasting arrangement having a plurality of node stations connected by an active LAN link path through which communication is normally held and at least one spare LAN link path, wherein each of the node stations comprises: a transmission device for transmitting a communication signal; a reception device for receiving the communication signal; a pilot signal insertion device for inserting a pilot signal into the communication signal; a device for detecting the pilot signal inserted in the communication signal; and a link path changeover device for changing the active LAN link path to one of the spare LAN link paths when the pilot signal has become undetectable. The pilot signal is inserted into the communication signal transmitted over the active LAN link path by the pilot signal insertion device of one of the plurality of node stations having controls as a master supervisor. The inserted pilot signal is detected by a pilot signal detection device of other node stations having no controls as the master supervisor, whereby the active LAN link path is maintained to be used for communication. In the event of the pilot signal becoming undetectable at least by one of the other node stations, the link path changeover device of the master supervisor node station changes the link path used for communication from the active LAN link path to one of the spare LAN link paths and, at the same time, the link path changeover device of the other node stations change the link path used for communication from the active LAN link path to the spare LAN link path wherefrom the pilot signal has become detectable.

The node station having controls as the master supervisor is either fixedly set in advance or selected by a method for acquiring a token or the like. Each node station includes an informing device for regularly informing the master supervisor node station of its detection of a pilot signal.

Each node station preferably includes an idle signal generation device for generating idle signals, a device for delivering the idle signals to spare LAN link paths through which no pilot signal is transmitted, and a device for detecting the idle signal.

In accordance with another aspect of the present invention, there is provided a link changeover control system for a LAN of a broadcasting arrangement having a plurality of node stations connected by an active LAN link path through which communication is normally held and at least one spare LAN link path comprising: a master supervisor node station including a pilot signal insertion device for inserting a pilot signal into a communication signal and a first link path changeover device for changing the active LAN link path to one of the spare LAN link paths when the pilot signal from the active LAN link path becomes undetectable; a plurality of normal node stations each including a device for detecting the pilot signal inserted in the communication signal, an informing device for regularly informing the master supervisor node station of its detection of the pilot signal, and a second link path changeover device for changing, when the pilot signal has become detectable from the one spare LAN link path, the active LAN link path to the spare LAN link path wherefrom the pilot signal is detected. The pilot signal is inserted into the communication signal transmitted over the active LAN link path by the pilot signal insertion device of the master supervisor node station and the inserted pilot signal is detected by the pilot signal detection device of the normal node stations, whereby the active LAN link path is maintained to be used for communication. In the event of the pilot signal becoming undetectable at least by one of the normal node stations, the first link path changeover device of the master supervisor node station changes the link path used for communication from the active LAN link path to one of the spare LAN link paths. At the same time, the second link path changeover device of the normal node stations change the link path used for communication from the active LAN link path to the spare LAN link path from which the pilot signal has become detectable.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 9 is a schematic structural diagram of a communication signal transmitted between node stations of each of the above described embodiments.

DESCRIPTION OF THE PREFERRED EMBODIMENTS

Figure 1:
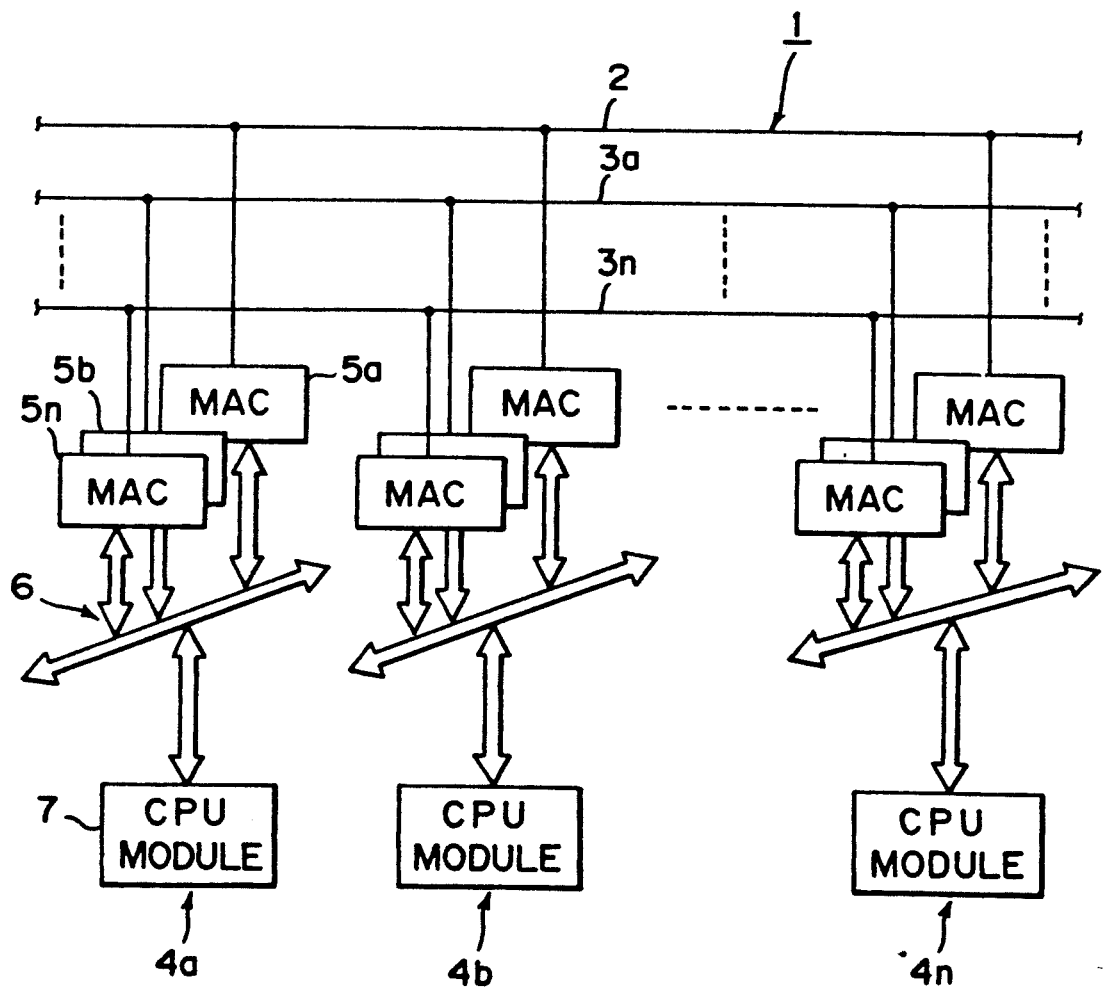
FIG. 1 is a schematic structural diagram for explaining a prior art changeover control system for a LAN of a broadcasting arrangement.

Embodiments of the present invention will be described in detail with reference to the accompanying drawings. In the description of each embodiment, component parts like or corresponding to those of the prior art example shown in FIG. 1 will be denoted by corresponding reference numerals.

Figure 2:
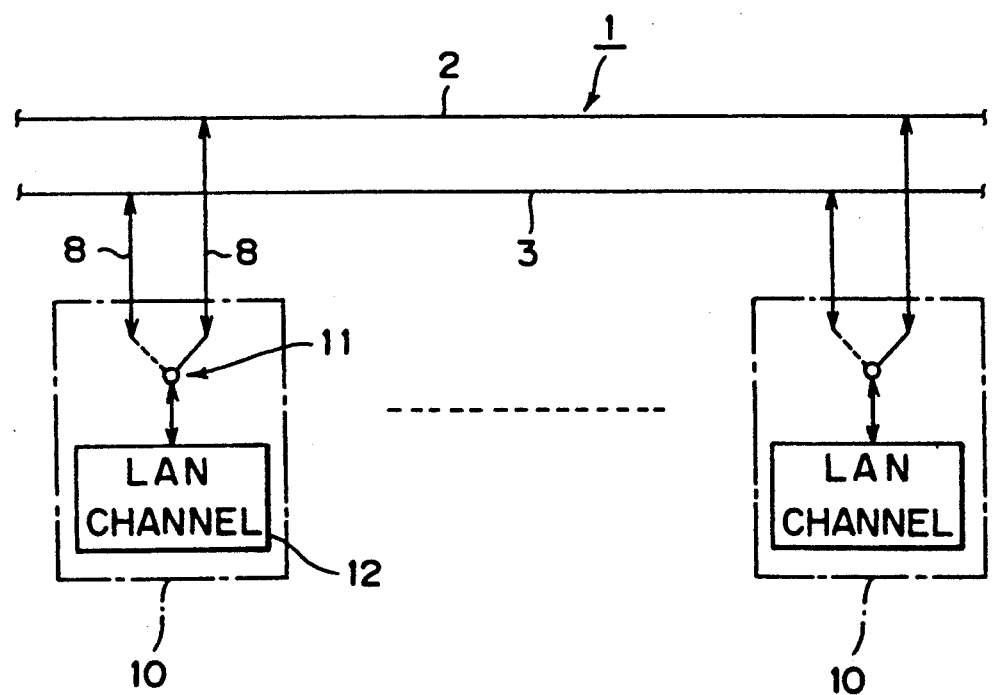
FIG. 2 is a schematic structural diagram for explaining a changeover control system for a LAN of a broadcasting arrangement structured of '1+1' LAN link paths according to a first embodiment of the present invention.

Referring to FIG. 2, there is shown a LAN of a broadcasting arrangement according to a first embodiment of the present invention. Multiplexed link paths 1 are formed of an active LAN link path 2 and a spare LAN link path 3 used as a spare. The multiplexed link paths 1 are connected with a plurality of node stations 10 of the same structure. More specifically, each node station 10 is connected to the LAN link paths 2 and 3 by a pair of LAN link path branches 8. Each node station 10 includes a switch 11 for switching between the active LAN link path 2 and the spare LAN link path 3 through the LAN link path branches 8 and a LAN channel 12 for executing the switch control of the switch 11 and the like. Such an arrangement as described above is defined herein as '1+1' LAN link path spare arrangement.

Figure 3:
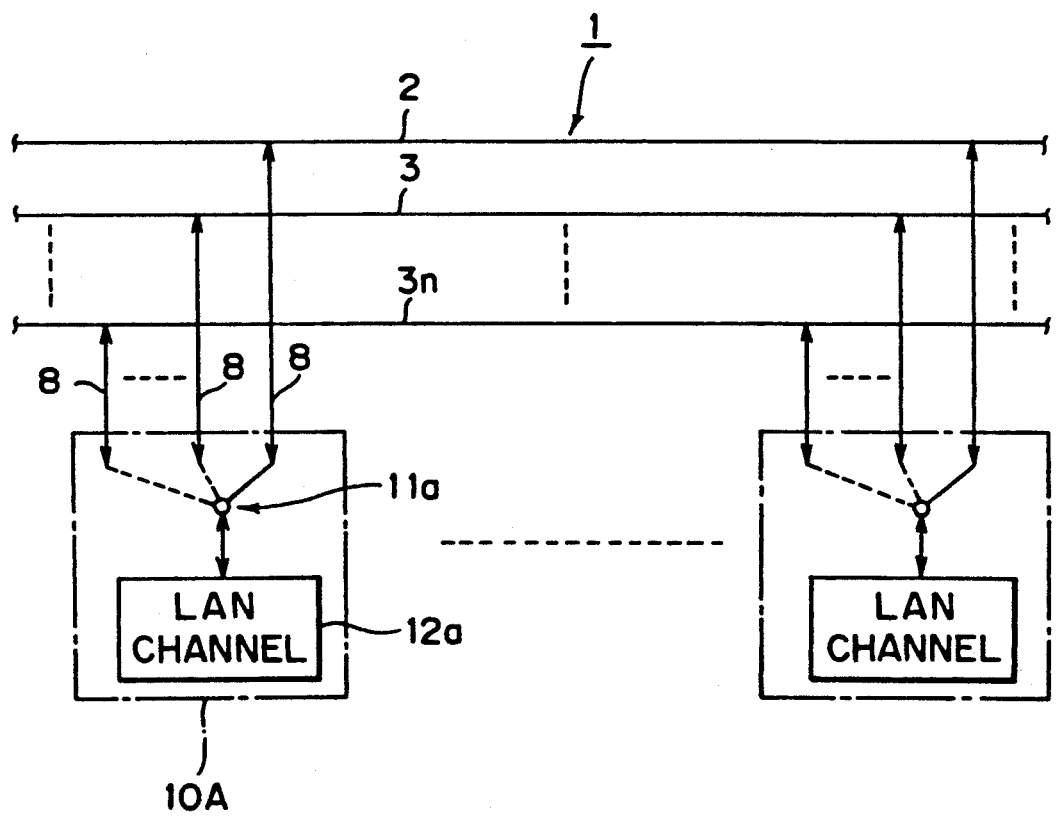
FIG. 3 is a schematic structural diagram for explaining a changeover control system for a LAN of a broadcasting arrangement structured of '1+n' LAN link paths according to a second embodiment of the present invention.

Referring to FIG. 3, there is schematically shown a LAN of a broadcasting arrangement according to a second embodiment of the present invention. In the present embodiment, multiplexed link paths 1 are formed of one active LAN link path 2 and a plurality of spare LAN link paths 3, . . . , 3n, and a plurality of node stations 10A of the same structure are connected to each of the LAN link paths through a plurality of LAN link path branches 8. The node station 10A includes a switch 11a for switching between the active LAN link path 2 and the plurality of spare LAN link paths 3, . . . , 3n and a LAN channel 12a for executing the switch control of the switch 11a and the like. Such arrangement as described above is herein defined as '1+n' LAN link path spare arrangement.

Figure 4:
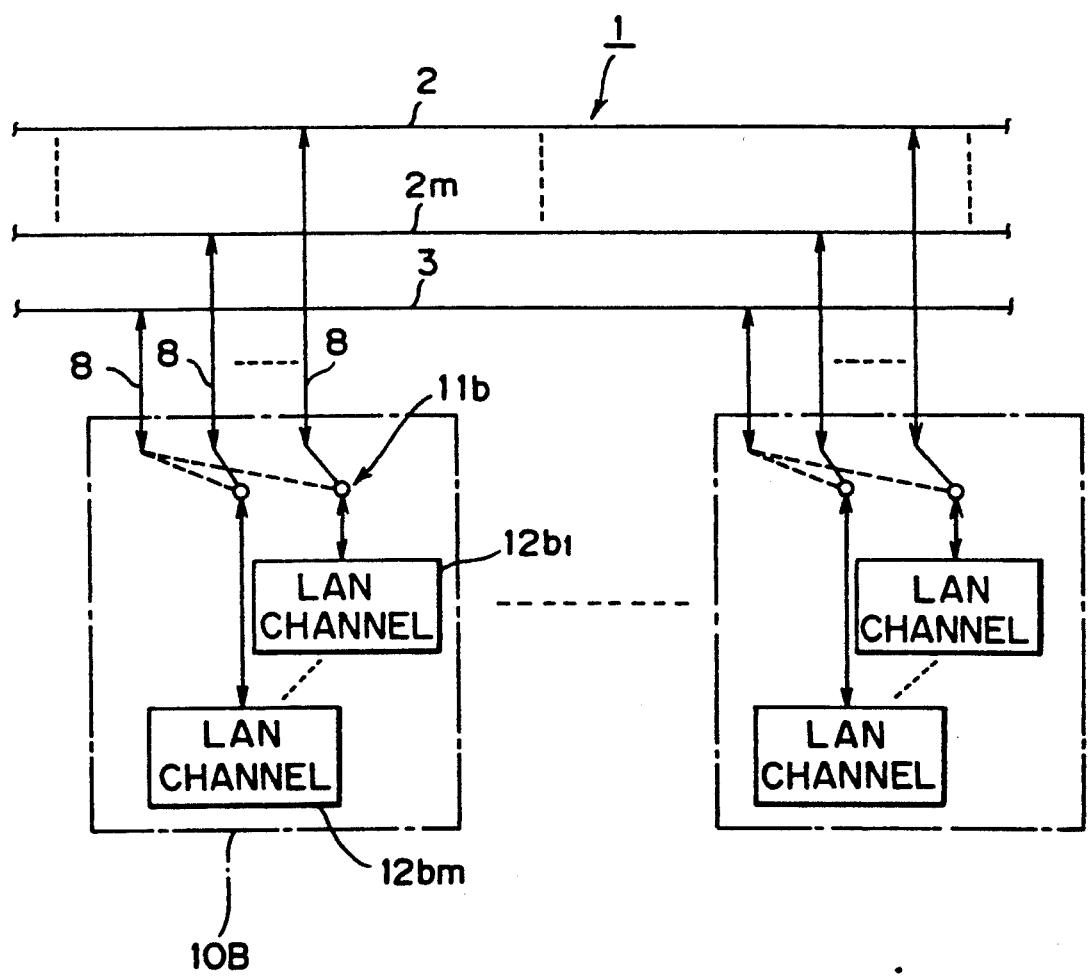
FIG. 4 is a schematic structural diagram for explaining a changeover control system for a LAN of a broadcasting arrangement structured of 'm+1' LAN link paths according to a third embodiment of the present invention.

Referring to FIG. 4, there is schematically shown a LAN of a broadcasting arrangement according to a third embodiment of the present invention. In the present embodiment, multiplexed link paths 1 are formed of a plurality of active LAN link paths 2, . . . , 2m and one spare LAN link path 3, and a plurality of node stations 10B of the same structure are connected to each of the LAN link paths through a plurality of LAN link path branches 8. The node station 10B includes a switch 11b for switching between the plurality of active LAN link paths 2, . . . , 2m and the one spare LAN link path 3 and a plurality of LAN channels $12b_1$, . . . , $12b_m$ for executing the switch control of the switch 11b and the like. The third embodiment is, in an arrangement of a plurality of active LAN link paths 2, . . . , 2m connected with a plurality of node stations 10B, the case where there is provided one spare LAN link path 3 for relieving one of the active LAN link paths when it becomes inoperative. Such arrangement as described above is herein defined as 'm+1' LAN link path spare arrangement.

Figure 5:
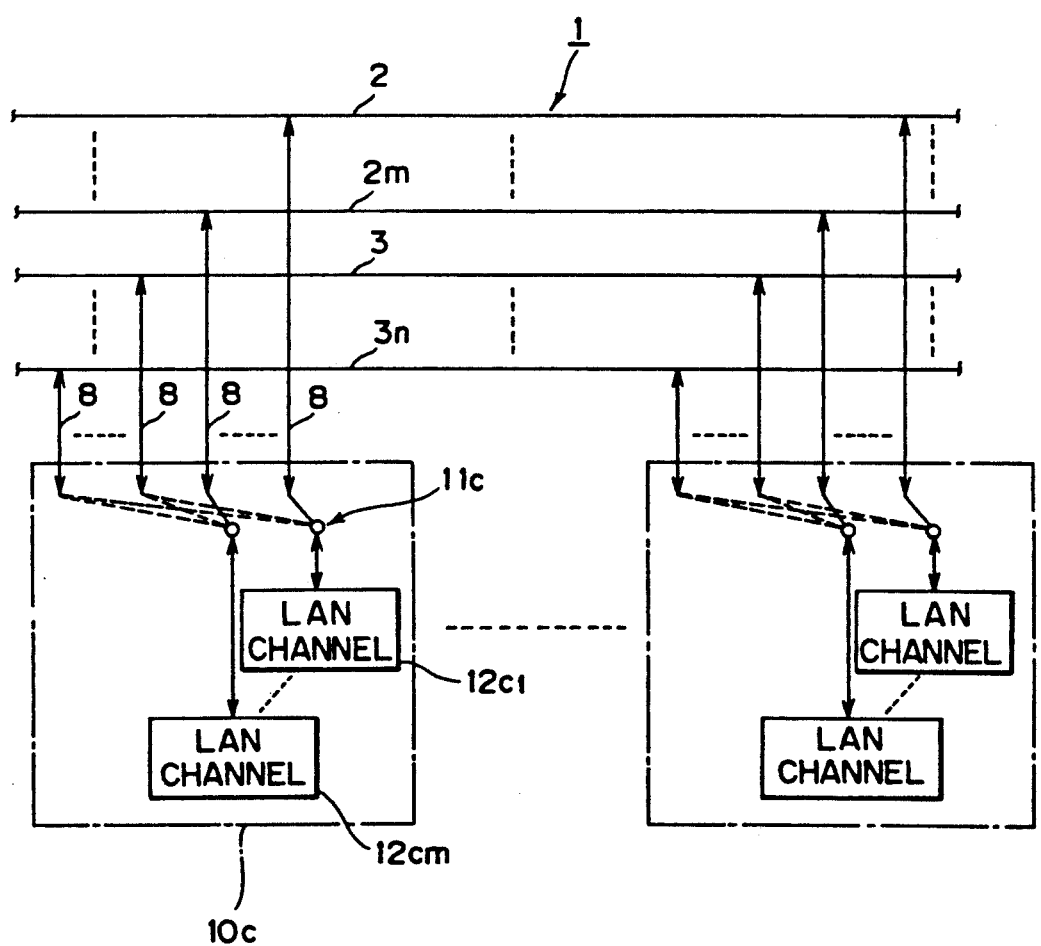
FIG. 5 is a schematic structural diagram for explaining a changeover control system for a LAN of a broadcasting arrangement structured of 'm+n' LAN link paths according to a fourth embodiment of the present invention.

Referring to FIG. 5, there is schematically shown a LAN of a broadcasting arrangement according to a fourth embodiment of the present invention. In the present fourth embodiment, multiplexed link paths 1 are formed of a plurality of active LAN link paths 2, ..., $2m$ and a plurality of spare LAN link paths 3, ..., $3n$, The multiplexed link paths 1 are connected with a plurality of node stations 10C through a plurality of LAN link path branches 8 and each node station 10C includes a switch 11c for switching between the plurality of active LAN link paths 2, ..., $2m$ and the plurality spare LAN link paths 3, ..., $3n$ and a plurality of LAN channels $12c_1$, ..., $12c_m$ for executing the switch control of the switch 11c and the like. Such arrangement as described above is herein defined as 'm+n' LAN link path spare arrangement. In the present embodiment, the active LAN link path 2, ..., $2m$ can use any of the spare LAN link paths 3, ..., $3n$ as its spare.

The above described structures of the first to fourth embodiments of the present invention are different in essence only in the number of active LAN link paths on service during the normal operation. Therefore, operations of all the embodiments of the present invention will be understood if the '1+n' LAN link path spare arrangement of the second embodiment shown in FIG. 3 is explained.

Figure 6:
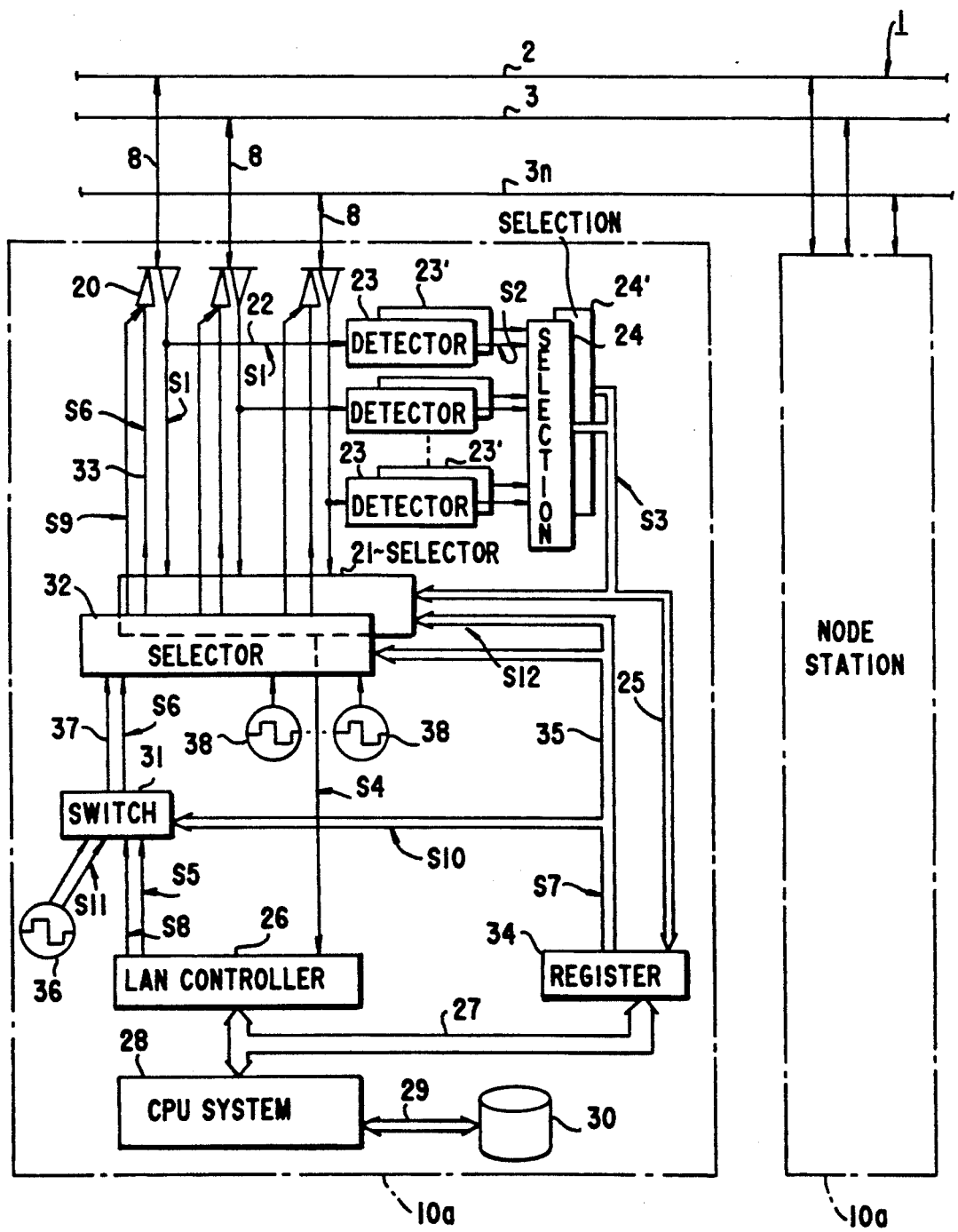
FIG. 6 is a schematic circuit diagram of a node station of the LAN of a broadcasting arrangement shown in FIG. 3.

Now, general structure and operation of the node station 10A will be described with reference to FIG. 6. The active LAN link path 2 and the plurality of spare LAN link paths 3, ..., $3n$ are connected with their respective transceivers 20 through the LAN link path branches 8. Since the node station 10A, when it become a master supervisor node station having control over all other node stations, operates differently from when it became a normal node station having no such control, description will be given below as to each case.

First, the operation of the node station 10A when it functions as the normal node station will be described.

The transceiver 20 connected as described above performs half duplex/full duplex conversion or reverse conversion and separate or combine a transmitted signal output from the node station 10A and a received signal input to the node station 10A. A received signal S1, which is transmitted from the active LAN link path 2 and received through the transceiver 20, is input to an effective received signal selector 21 and also input, through a plurality of received signal branches 22, to detectors 23 and 23' connected to each of the branches 22. The detector 23 is for detecting an effective link path indicating signal, i.e., a pilot signal, inserted in the received signal S1. The detector 23' is for detecting an idle signal transmitted through the spare LAN link path 3, ..., $3n$ which is not an active link path currently used for communication.

If a pilot signal is detected by the detector 23, a logic output signal S2 indicative of presence or absence of the pilot signal is delivered from the detector 23 to an effective received signal selection determination circuit 24 and output from this determination circuit 24 as an effective received signal selection output signal S3. If, on the other hand, an idle signal is detected by the detector 23', the idle signal is input to another determination circuit 24', wherein it is checked whether or not there is a breakage in the link path from which the idle signal is being transmitted.

The effective received signal selection output signal S3 is input to the effective received signal selector 21 through a first bus line 25, whereby an effective received signal S4 is input to the receiver portion of a LAN controller 26. Meanwhile, the output of the determination circuit 24' is transmitted to a CPU system 28 through the first bus line 25 and a register 34, whereby existence or nonexistence of a breakage in the spare LAN link paths 3, ..., $3n$ which are not currently in use is recognized by the CPU system 28.

The LAN controller 26 is connected with the CPU system 28 through a CPU bus line 27 and controlled by a LAN manager incorporated in the CPU system 28. That is, the LAN is handled in accordance with the received signal S4 input to the LAN controller 26.

If information data extracted from the received signal S4 under the control of the CPU system 28 is that addressed to itself, the CPU system 28 determines the data to be effective information data sent from another node station 10A to itself, and the data is stored in an external storage device 30 connected with the CPU system 28 through an I/O bus line 29.

When it is desired to transfer the information data to another node station 10A, the information data to be transferred is taken out of the external storage device 30 and input to the CPU system 29 through the I/O bus line 29. Then, the data is delivered by the LAN manager incorporated in the CPU system 28 to the transmitter portion of the LAN controller 26 and, therein, the data is converted into a transmitting signal (a serial signal) S5. The transmitting signal S5 is input, as a transmitting signal source S6, to an effective transmission path selector 32 through a pilot signal/transmitting signal switch 31.

Which transmission path of a plurality of transmission paths 33 the effective transmission path selector 32 selects to transmit the transmitting signal source S6 to one of the link paths 2, 3, ..., $3n$ is determined as described below. First, the CPU system 28 recognizes information of that path which is indicated by the effective received signal selection output signal S3, through a register 34 for effective signal selection and the CPU bus line 27. Under the control of the CPU system 28 in accordance with the recognized information, an indication of selected transmission path is established in the register 34 through the CPU bus line 27.

The information established as the indication of selected transmission path is input as a transmission control output signal S7 to the effective transmission path selector 32 through a second bus line 35. The effective transmission path selector 32, in turn, outputs the transmitting signal source S6 to the transmission path 33 connected with that transceiver 20 with which the effective reception path is connected.

At the same time, a transmission driver blocking signal S9 for bringing the transceiver 20 to high impedance is obtained by inputting a transmission driver control output signal S8 output from the LAN controller 26 to the effective transmission path selector 32 through the switch 31 and a transmission driver control line 37. Through the above described operations, an effective signal transmitted from any of the LAN link paths 2, 3, ..., $3n$ is received and data to be transmitted is output from the transceiver 20 connected with the effective LAN link path.

When the node station 10A functions as a normal node, the pilot signal/transmitting signal switch 31 fixedly selects and outputs the transmission driver control output signal S8 and the transmitting signal S5, in accordance with a switch control output signal S10 output from the register 34 on the basis of the recognition made by the CPU system 28.

Now, operations when the node station 10A functions as master supervisor node station will be described.

The node station 10A having controls as master supervisor must transmit the effective LAN link path indicating signal, i.e., the pilot signal, to other node stations 10A, as its quite unique job, completely different from the above described operations performed by a normal node station. More specifically, the same must transmit the pilot signal S11 generated from a pilot signal generator 36 as inserted in the transmitting signal S5 by turning the pilot signal/transmitting signal switch 31 to the side of pilot signal transmission at regular intervals. This is executed by the CPU system 28, which recognizes that its own node station is the master supervisor, controlling to establish a pilot signal/transmitting signal switching indication in the register 34 through the CPU bus line 27.

The information established in the register 34 is transmitted to the switch 31 through the second bus line 35, the mode of the switch 31 is turned to the side of pilot signal transmission, and the pilot signal S11 is input, as the transmitting signal source S6, to the effective transmission path selector 32 through the switch 31. At this point, since the node is connected to an effective link path, the use of which is designated by the node as one of the functions thereof as master supervisor, the pilot signal S11 is transmitted to other node stations 10A as normal nodes. The pilot signal S11 received by the normal node station 10A causes the same operations as caused by the received signal by the normal node in the above described case, whereby the normal node station 10A is connected to the effective LAN link path designated by the master supervisor node station.

The selector 32 are connected with a plurality of idle signal generators 38, which respectively generate idle pattern signals having different priority for changeover to spares. The idle signal is delivered to all LAN link paths other than the LAN link path to which the pilot signal is delivered, and the LAN link path to be changed over thereto and use is determined by the priority indicated by the pattern.

Upon becoming unable of detection of the pilot signal by the detector 23 of a normal node station 10A, it is determined by the determination circuit 24 that some trouble occurred in the LAN link path with which the detector is connected. For example, when it is determined that some trouble occurred in the active LAN link path 2, the trouble information is recognized by the CPU system 28. The master supervisor node station is monitoring whether or not communication with normal node stations is properly maintained at all times and carries out communication through the effective LAN link path which is designated by itself. Whether the communication is normal or not is recognized by whether there is a response or not from the normal node station to the request for confirmation of arrival made by the master supervisor node station. When a response has not been made by the normal node station 10A to the request for confirmation of arrival within a predetermined period, the master supervisor node station 10A recognizes that some trouble has occurred in the LAN link path which has been in use.

The selector 32 of the master supervisor node station 10A shifts the communication path to the LAN link path through which the idle signal with the highest priority is flowing. Normal node stations can easily determine which of the spare LAN link paths 3, ..., 3n was switch selected by detecting the pilot signal with the detector 23. Thereafter, communication is carried out through the newly selected spare LAN link path.

By detecting the idle signal, it can be checked whether or not there is a breakage in the LAN link path through which the idle signal is flowing. Further, by providing idle signals with priority, the spare LAN link path to be switch selected next can be specified.

The effective LAN link path being currently designated for use is either that which was specified as a default link path at the time of starting up and has thereafter been continuously in use because the communication between the master supervisor node station and the normal node stations has been held normally, or that which was switch selected in place of another LAN link path causing a break of normal communication for some reason and has been in use up to the present time because the communication between the master supervisor node station and the normal node stations has since then been held normally.

In deciding the master supervisor node station, there are two methods, a fixed setting method and a variable setting method. The fixed setting method is effective in the case where there is only one device that can be the master supervisor node station. The fixed setting method is that in which the master supervisor node station and the normal node stations are determined fixedly and, once they are determined, they are never changed. The variable setting method is that conforms to the method acquiring a token in a token bus provided in IEEE 802.4.

The master supervisor node station performs its signal receiving operation by controlling the effective reception path selector 21 by supplying this selector 21 with a set reception control output signal S12 having the same control information as the transmission control output signal S7 output from the register 34 designating the LAN link path on the transmission side. However, the set reception signal control output signal S12 includes the master supervisor node station/normal node station effectiveness selection information, and if this information flag is indicating effectiveness of the master supervisor node station, the effective reception signal selection output signal S3 output from the determination circuit 24 is invalidated in the effective reception path selector 21.

Now, details of the structure of the node station schematically shown in FIG. 6 and its operations will be described below with reference to FIG. 7 and FIG. 8.

Figure 7:
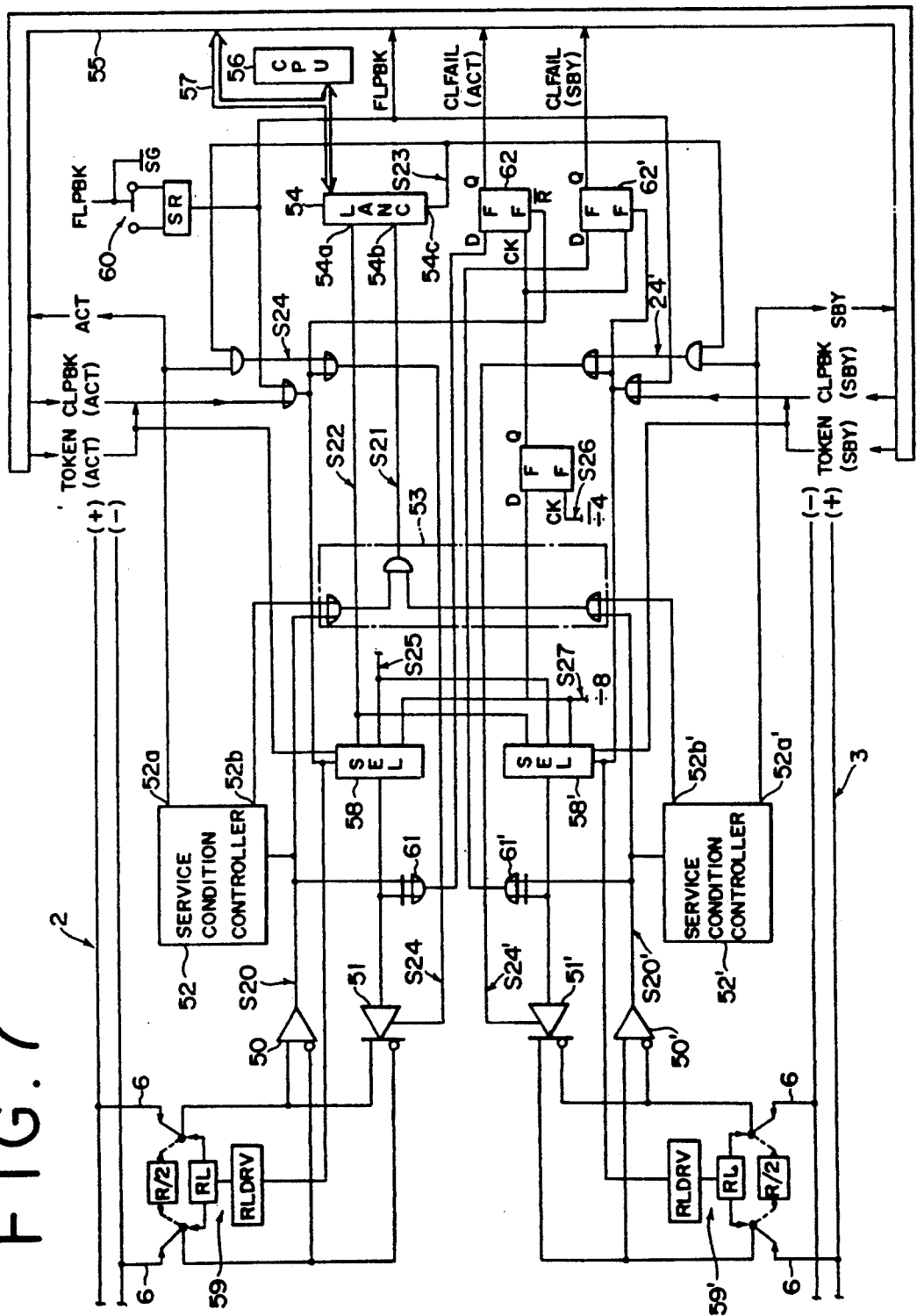
FIG. 7 is a circuit diagram of the structure of the node station shown in FIG. 6 in more detail.

Referring to FIG. 7, reference numeral 50 denotes a receiver and 51 denotes a driver, and the receiver 50 and the driver 51 are terminating the active LAN link path 2. Reference numeral 50' denotes a receiver terminating the spare LAN link path 3 and 51' denotes a driver. A received signal S20 or S20' received by the receiver 50 or 50' is input to a service condition controller 52 or 52' and further input to an effective received signal selector 53. The service condition controller 52, 52' detects a pilot signal indicating effectiveness of the LAN link path from the input received signal S20, S20' and outputs a signal indicating whether or not the received signal S20, S20' is effective. The effective received signal selector 53 is controlled by the signal output from the output terminal 52b, 52b', of the service condition controller 52, 52' and an effective received signal S21 is input to a receiving terminal 54b of a LAN controller 54.

On the other hand, the signal output from the output terminal 52a, 52a' of the service condition controller 52, 52' is a signal indicative of presence or absence of the pilot signal and the same is input to a CPU system 56 through an I/O register 55 and a CPU bus line 57, whereupon presence or absence of the pilot signal is recognized by the CPU system 56. Further, the CPU system 56 includes a LAN manager controlling the LAN controller 54 connected therewith through the CPU bus line 57 thereby managing the LAN, and the CPU system 56 outputs information to be transmitted to an external CPU system from an output terminal 54a of the LAN controller 54 under the control of the LAN manager within the CPU system 56.

A transmitting signal S22 output from the output terminal 54a of the LAN controller 54 is input to each driver 51, 51' through a selector for control loopback 58, 58'. Whether or not the input effective transmitting signal S22 should be output from the driver 51, 51' is controlled and determined by the signal S24, S24' obtained by having an RTS (Request To Send) signal S23 output from an output terminal 54c of the LAN controller 54 indicative of effectiveness of the transmitting signal S22 inhibited by a signal indicative of the presence or absence of the pilot signal output from the output terminal 52a, 52a' of the service condition controller 52, 52'.

That is, by controlling, with the RTS signal S23, the driver 51 or 51' terminating the LAN link path 2 or 3 that has the pilot signal and is deemed effective, the effective transmitting signal S22 is output to either one of the LAN link paths 2 and 3 which is effective.

Reference numerals 59 and 59' denote loopback mechanisms for performing line loopback which are used for identifying a damaged line of the LAN link path and a damaged node. In the line loopback, there are both a controlled loopback operated under the control of the CPU system 56 and a forced loopback forcedly operated by hand independently of the above mentioned controlled loopback.

The controlled loopback is operated under the control of the CPU system 56 through the I/O register 55. The forced loopback is directly operated through a switch 60. The results are verified by loopback verification mechanisms and used for maintenance. The verification by the loopback verification mechanisms is carried out by transmission of signals obtained as the results of loopback performed by the loopback mechanisms 59, 59' to exclusive OR logic elements 61, 61' and data flip-flops (DFFs) 62, 62', which constitute the loopback verification mechanisms, through the receivers 50, 50' and inputting of the signals to the CPU system 56 through the I/O register 55.

Now, the operation related to the service condition controllers 52 and 52' shown in FIG. 7 will be given below with reference to FIG. 8.

To begin with, structure of the above described effective received signals S20 and S20' and transmitting signal S22, i.e., the signals communicated between the LAN nodes 10A will be described. The communication signal is structured of main information signals Sa with pilot signals Sp interleaved therebetween as shown in FIG. 9. As the pilot signal Sp, an alternating signal (hereinafter called "long period alternating signal") with such a relatively large period that will not appear in the main information signal Sa is used.

Figure 8:
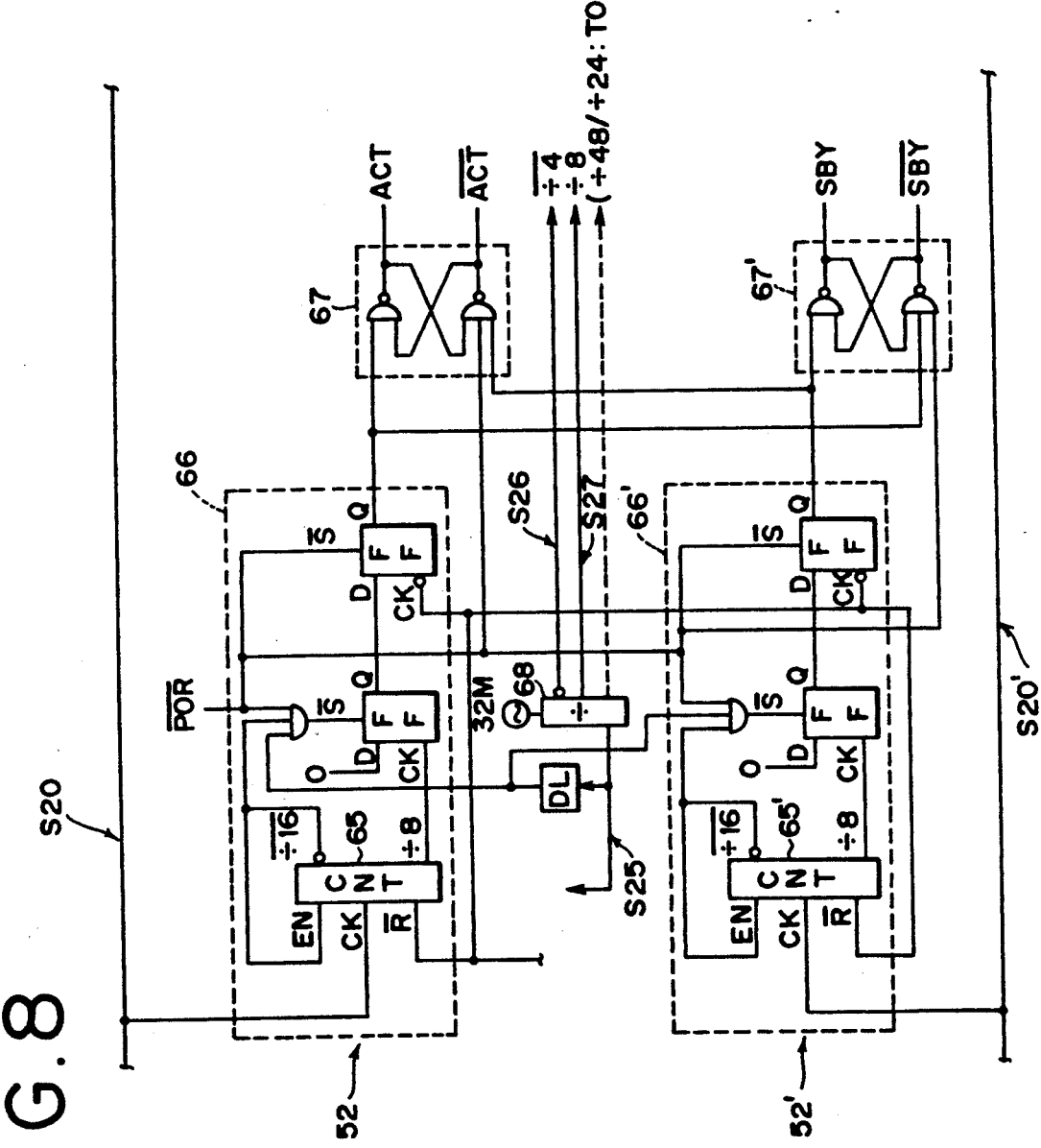
FIG. 8 is a circuit diagram of service condition controllers shown in FIG. 7.

Referring to FIG. 8, reference numerals 65 and 65' are counters as constituents of the service condition controllers 52 and 52'. The counters 65, 65' are for counting alternating edges of the long period alternating signals (pilot signals Sp) included in the received signal S20, S20' within a predetermined interval and calculating how many alternating edges are included at the least and at the most within a predetermined interval. The state of the output of the counters 65, 65' is adapted to change, for example, from "1" to "0" or from "0" to "1" according to the calculated value, i.e., the number of counts. For example, when the number of counts of the alternating edges exceeds a maximum value, next trigger of a regular interval is input to the counter 65, 65', whereby the counters 65, 65' are brought to a state stopping its counting operation until it is reset. When the number of counts exceeds a minimum value and next regular interval trigger is input before the number of counts exceeds the maximum value, only then, it recognizes that a pilot signal is detected and indicates the state by a specific logical output signal of counts "1" or "0".

The described operation is constantly performed at regular intervls and the detection of the pilot signal for one time is continued during the regular interval. Accordingly, the state is continuously maintained while a pilot signal is being detected. The operation is supported by pilot signal detectors 66, 66'.

When a main information signal, not a pilot signal, is transmitted between node stations over a LAN link path 2 or 3 (refer to FIG. 8), the pilot signal necessarily disappears and, hence, the pilot signal detection signal disappears. Even if the pilot signal detection signal thus disappears, service state indicators 67 and 67' retain whether the pilot signal, during the interval before the pilot signal detection signal disappears, was designating the active LAN link path 2 or the spare LAN link path 3, and therefore, there is made no such change in the effective LAN link path designation as to change the active LAN link path 2 to the spare LAN link path 3, or the spare LAN link path 3 to the active LAN link path 2.

However, if a pilot signal is detected, for example, for the spare LAN link path 3 during the interval following an interval during which a pilot signal for the active LAN link path 2 was detected, the effective LAN link path up to that time is changed, that is, the active LAN link path 2 is changed to the spare LAN link path 3. When there appears no pilot signal because a main information signal is transmitted between LAN nodes during the interval after that interval, the state of designation of the effective LAN link path designated during that interval is maintained until the pilot signal appears.

Reference numeral 68 denotes a reference timing generator. This generator 68 generates a pilot signal S25 (which represents the pilot signal Sp of FIG. 9) obtained by dividing the frequency of the signal of an oscillated frequency of 32 MHz by 512 or 256 and, further, generates a ¼ frequency divided signal S26 and a ½ frequency divided signal S27 as reference timing in the node station 10, as well as a 1/24 frequency divided signal applied to the controlled area defined by a dotted line and a 1/48 frequency divided signal to be applied to offices etc. within the controlled area. Whike the node station 10A is recognized as master supervisor node station, a signal indicative of presence or absence of a pilot signal is regularly output from the output terminal 52a of the service condition controller 52 or the output terminal 52a' of the service condition controller 52', and the pilot signal S25 output from the reference timing generator 68 is output from the driver 51 or 51' through the selectors 58 or 58' shown in FIG. 7. At the same time, the RTS signal S23 for making the driver 51 or 51' effective is controlled by the above described signal indicative of presence or absence of a pilot signal.

In each of the above described embodiments, a plurality of node stations of the same structure are connected to multiplexed LAN link paths and one node station is selected as master supervisor node station and communication is carried out between node stations. The master supervisor node station inserts a pilot signal into a communication signal and other node stations detect the pilot signal whereby a link path is maintained, and all the node stations use the link path. When it becomes difficult to maintain an active LAN link path for one cause or another, the pilot signal is switched to a spare LAN link path, and thereby, communications can be maintained.

In each of the above described embodiments, all the node stations were described to be of the same structure, but the present invention is not limited to that. It is also possible to design a master supervisor node station separately from others, and use such node stations that have no function to serve as master supervisor node station for other node stations. In such case, the master supervisor node station should be set fixedly and cannot be changed. However, since the function to serve as master supervisor node station can be omitted from the normal node stations, the initial cost when introducing the LAN facility can be greatly reduced.

What is claimed is:

1. A link changeover control system for a LAN of a broadcasting arrangement having a plurality of node stations connected by an active LAN link path through which communication is normally held and a plurality of spare LAN link paths, wherein each of said node stations comprises:
   transmission means for transmitting a communication signal;
   reception means for receiving the communication signal;
   pilot signal insertion means for inserting a pilot signal into the communication signal, said pilot signal indicating an effective LAN link path;
   means for detecting the pilot signal inserted in the communication signal; and
   link path changeover means for changing said active LAN link path to one of said spare LAN link paths when said pilot signal has become undetectable from said active LAN link path; wherein
   the pilot signal is inserted into the communication signal transmitted over said active LAN link path by said pilot signal insertion means of one of said plurality of node stations having control as a master supervisor, and the inserted pilot signal is detected by pilot signal detection means of other node stations having no control as the master supervisor, wherein said active LAN link path is maintained to be used for communication by detection of said pilot signal; and
   when the pilot signal becomes undetectable in said active LAN link path at least by one of said other node stations, said link path changeover means of said master supervisor node station changes the link path used for communication from said active LAN link path to one of said spare LAN link paths by inserting said pilot signal into said communication signal transmitted on said one of said spare LAN link paths and, at the same time, said link path changeover means of said other node stations change the link path used for communication from said active LAN link path to said one of said spare LAN link paths wherefrom the pilot signal has become detectable.

2. A link changeover control system for a LAN of a broadcasting arrangement according to claim 1, further comprising means for selecting a node station which has the control as the master supervisor, wherein each of said node stations further comprises informing means for regularly informing the master supervisor node station of detection of the pilot signal.

3. A link changeover control system for a LAN of a broadcasting arrangement according to claim 1, wherein said pilot signal insertion means comprises a pilot signal generator and switching means for switching the communication signal and the pilot signal passing therethrough at a predetermined timing.

4. A link changeover control system for a LAN of a broadcasting arrangement according to claim 1, wherein each of said node stations further comprises idle signal generation means for generating idle signals which indicates a non-active link path, idle signal delivery means for delivering the idle signals to spare LAN link paths transmitting no pilot signal therethrough, and detecting means for detecting the idle signal.

5. A link changeover control system for a LAN of a broadcasting arrangement according to claim 4, wherein said idle signal generation means includes a plurality of idle signal generators for generating idle signals of different patterns indicative of priority for changeover and said idle signal delivery means is adapted to deliver different idle signals to said spare LAN link paths, and wherein, in the event of a problem occurring in said active LAN link path, said active LAN link path is changed over to one of said spare LAN link paths according to the priorty of the idle signal.

6. A link changeover control system for a LAN of a broadcasting arrangement according to claim 1, wherein a plurality of node stations are connected by a plurality of active LAN link paths and said plurality of spare LAN link paths.

7. A link changeover control system for a LAN of a broadcasting arrangement having a plurality of node stations connected by an active LAN link path through which communication is normally held and a plurality of spare LAN link paths, said link changeover control system comprising:
   a master supervisor node station including (a) pilot signal insertion means for inserting a pilot signal into a communication signal, said pilot signal indicating an effective LAN link path and (b) first link path changeover means for changing said active LAN link path to one of said spare LAN link paths when the pilot signal from said active LAN link path becomes undetectable;
   a plurality of normal node stations each including means for detecting the pilot signal inserted in said communication signal, informing means for regularly informing the master supervisor node station of detection of the pilot signal, and second link path changeover means for changing, when the pilot signal has become detectable from one of said spare LAN link paths, said active LAN link path to one of said spare LAN link paths wherefrom the pilot signal is detected; wherein the pilot signal is inserted into the communication signal transmitted over said active LAN link path by said pilot signal insertion means of said master supervisor node station and the inserted pilot signal is detected by pilot signal detection means of said normal node stations, wherein said active LAN link path is maintained to be used for communication by detection of said pilot signal; and when the pilot signal becomes undetectable in said active LAN link path, at least by one of said normal node stations, said first link path changeover means of said master supervisor node station changes the link path used for communication from said active LAN link path to one of said spare LAN link paths by inserting said pilot signal into said communication signal transmitted on one of said spare LAN link paths and, at the same time, said second link path changeover means of said normal node stations change the link path used for communication from said active LAN link path to said one of said spare LAN link paths from which the pilot signal has become detectable.

8. A link changeover control system for a LAN of a broadcasting arrangement according to claim 7, wherein said pilot signal insertion means comprises a pilot signal generator and switching means for switching the communication signal and the pilot signal passing therethrough at a predetermined timing.

9. A link changeover control system for a LAN of a broadcasting arrangement according to claim 7, wherein said master supervisor node station includes idle signal generation means for generating idle signals which indicate a non-active LAN link path and idle signal delivery means for delivering the idle signals to spare LAN link paths transmitting no pilot signal therethrough, and wherein each of said normal node stations includes detecting means for detecting the idle signal.

10. A link changeover control system for a LAN of a broadcasting arrangement according to claim 9, wherein said idle signal generation means includes a plurality of idle signal generators for generating idle signals of different patterns indicative of priority for changeover and said idle signal delivery means is adapted to deliver different idle signals to said spare LAN link paths, and wherein, in the event of a problem occurring in said active LAN link path, said active LAN link path is changed over to one of said spare LAN link paths according to the priority of the idle signal.

* * * * *